US012117206B2

(12) United States Patent
Choi et al.

(10) Patent No.: US 12,117,206 B2
(45) Date of Patent: Oct. 15, 2024

(54) SYSTEM AND METHOD FOR DISCHARGING CARBON MONOXIDE BY USING CARBON MONOXIDE LEAKAGE ALARM DEVICE

(71) Applicant: NANOKEM CO., LTD., Gyeongsangbuk-do (KR)

(72) Inventors: Young-Hwan Choi, Seoul (KR); Sung-An Ha, Gyeongsangbuk-do (KR); Jung-Jae Jang, Incheon (KR)

(73) Assignee: NANOKEM CO., LTD., Gyeongsangbuk-do (KR)

( * ) Notice: Subject to any disclaimer, the term of this patent is extended or adjusted under 35 U.S.C. 154(b) by 0 days.

(21) Appl. No.: 17/768,989

(22) PCT Filed: Oct. 13, 2020

(86) PCT No.: PCT/KR2020/013940

§ 371 (c)(1),
(2) Date: Apr. 27, 2022

(87) PCT Pub. No.: WO2021/075824

PCT Pub. Date: Apr. 22, 2021

(65) Prior Publication Data

US 2024/0105044 A1 Mar. 28, 2024

(30) Foreign Application Priority Data

Oct. 16, 2019 (KR) ........................ 10-2019-0128265
Oct. 16, 2019 (KR) ........................ 10-2019-0144687

(51) Int. Cl.
*F24H 15/45* (2022.01)
*F24H 9/20* (2022.01)
(Continued)

(52) U.S. Cl.
CPC ............... *F24H 15/45* (2022.01); *F24H 9/20* (2013.01); *F24H 15/12* (2022.01); *F24H 15/20* (2022.01);
(Continued)

(58) Field of Classification Search
CPC .............................. G08B 21/14; F24H 15/395
See application file for complete search history.

(56) References Cited

U.S. PATENT DOCUMENTS 8,172,153 B1 * 5/2012 Kennedy ................ F24F 11/523 236/94
10,670,302 B2 * 6/2020 Hazzard ................ F24H 15/281
(Continued)

FOREIGN PATENT DOCUMENTS

JP H09-264548 A 10/1997
JP 2009-216407 A 9/2009
(Continued)

OTHER PUBLICATIONS

Extended European Search Report dated Apr. 5, 2023 received in EP Application No. 20876035.5, 8 pages.
(Continued)

*Primary Examiner* — Mohamed Barakat
(74) *Attorney, Agent, or Firm* — Scully, Scott, Murphy & Presser, P.C.

(57) ABSTRACT

The present disclosure relates to a system and a method for discharging carbon monoxide (CO) by using a CO leakage alarm device and, more specifically, to a system and a method for discharging CO by using a CO leakage alarm device, the system and the method being operated on the basis of the Internet of things (IoT) so as to: detect CO leakage caused by damage to a boiler flue and sound an alarm through at least two from among the CO leakage alarm device, a boiler controller, a wall pad, and the like, automatically perform boiler ventilation and indoor air ventilation when the leakage is determined; and directly notify CO leakage-related authorities and users about the CO leakage.

5 Claims, 5 Drawing Sheets

(51) Int. Cl.

| | |
|---|---|
| ***F24H 15/12*** | (2022.01) |
| ***F24H 15/20*** | (2022.01) |
| ***F24H 15/345*** | (2022.01) |
| ***F24H 15/395*** | (2022.01) |
| ***G08B 21/14*** | (2006.01) |
| *F24H 15/421* | (2022.01) |

(52) U.S. Cl.

CPC ......... *F24H 15/345* (2022.01); *F24H 15/395* (2022.01); *G08B 21/14* (2013.01); *F24H 15/421* (2022.01)

(56) References Cited

U.S. PATENT DOCUMENTS

| | | | | |
|---|---|---|---|---|
| 2002/0111132 | A1 | 8/2002 | Meneely, Jr. | |
| 2006/0049268 | A1 | 3/2006 | Weimer et al. | |
| 2016/0321899 | A1* | 11/2016 | Mingo | G08B 25/10 |
| 2018/0233022 | A1* | 8/2018 | Nguyen | F24H 15/464 |
| 2018/0299159 | A1 | 10/2018 | Ajax et al. | |
| 2019/0172333 | A1 | 6/2019 | Combe | |
| 2019/0390873 | A1* | 12/2019 | Suzuki | F25B 49/02 |

FOREIGN PATENT DOCUMENTS

| | | | | |
|---|---|---|---|---|
| KR | 10-1996-0014837 | A | | 5/1996 |
| KR | 10-2011-0061695 | A | | 6/2011 |
| KR | 20110061695 | A | * | 6/2011 |
| KR | 20150021768 | A | | 3/2015 |
| KR | 10-2017-0066906 | A | | 6/2017 |
| KR | 20170066906 | A | * | 6/2017 |
| KR | 10-2095203 | B1 | | 5/2020 |

OTHER PUBLICATIONS

Extended European Search Report dated Apr. 11, 2023 received in EP Application No. 20877129.5, 8 pages.

International Search Report dated Feb. 16, 2021 issued in PCT/KR2020/013940, 5 pages.

* cited by examiner

SYSTEM AND METHOD FOR DISCHARGING CARBON MONOXIDE BY USING CARBON MONOXIDE LEAKAGE ALARM DEVICE

TECHNICAL FIELD

The present disclosure relates to a system and a method for discharging carbon monoxide (CO) by using a CO leakage alarm device and, more specifically, to a system and a method for discharging CO by using a CO leakage alarm device, the system and the method being operated on the basis of the Internet of things (IoT) so as to: detect CO leakage caused by damage to a boiler flue and sound an alarm through at least two from among the CO leakage alarm device, a boiler controller, a wall pad, etc.; automatically perform boiler ventilation and indoor air ventilation when the leakage is determined; and directly notify CO leakage-related authorities and users about the CO leakage.

BACKGROUND ART

In general, a boiler burns fuels such as coal, kerosene, and diesel containing carbon components to control water and indoor temperature.

Boilers generate carbon monoxide (CO) during the process of burning fuels containing carbon components. CO is a colorless, odorless, tasteless, and non-irritating gas that is harmful to the human body.

Therefore, a boiler flue system, which is an exhaust pipe connected from the boiler to the outside, is formed in the boiler so as to discharge the CO being generated to the outside.

However, in the case where such boiler flue is damaged indoors or the connection is incorrect, there has been a risk that CO may be leaked through the connection gap and the broken gap of the exhaust pipe.

When CO is leaked, it is difficult for people to recognize the CO leakage because it is a colorless, odorless, tasteless, and non-irritating gas. When people inhale CO, it binds with hemoglobin in the red blood cells and prevents oxygen from being transported to tissues. Therefore, it is a dangerous gas that can threaten the lives of people by means of hypoxia.

In fact, a number of casualties are frequently occurring due to CO leakage caused by incorrect connection and an old boiler flue.

In order to detect and block CO leakage from such boiler, a variety of CO leakage detection devices (e.g., Korean Utility Model Application Publication No. 20-2009-0007826 [Hybrid Alarm System for Boiler]) have been developed and applied, which measures CO inside and around the boiler and generates an alarm when the CO level exceeds a certain threshold.

Conventionally, the existing CO leakage detection devices generate a CO alarm when the reference time according to the level of the CO value being measured is exceeded. Since the conventional CO leakage detection devices generate an alarm only when the reference time according to the level is exceeded, these conventional CO leakage detection devices had a problem in that even when a sudden large amount of CO leakage occurs due to the damage to the flue, the alarm is not generated unless the corresponding reference time is exceeded, thereby placing the user in danger.

Additionally, the conventional CO leakage detection devices had problems in that the alarm may not be heard even when the alarm goes off because these devices were installed in a location separated from the space where the user lives, in that the alarm may not be recognized until the user is poisoned by CO while sleeping, and in that the user may be directly poisoned by CO when the alarm function of the leakage detection devices fails.

Additionally, these conventional CO leakage detection devices had problems in that even after the user hears the alarm from a CO leakage detection device and shuts down the operation of the boiler, or even after the operation of the boiler is automatically shut down by a CO leakage detection device, CO still may remain within the boiler and the CO inside the boiler may leak into the user's living space, thus having a risk of doing harm to the user.

Additionally, the conventional CO leakage detection devices had problems in that since they generate an alarm according to the detection of CO leakage or only shut down the operation of the boiler, the user had to open the window in the living space and directly ventilate the living space so as to remove the CO that has already spread throughout the user's living space, which could endanger the unconscious user due to an exposure to CO.

SUMMARY

Accordingly, an object of the present disclosure is to provide a system and a method for discharging carbon monoxide (CO) by using a CO leakage alarm device, which detects CO leakage caused by damage to a boiler flue and sounds an alarm through at least two from among the CO leakage alarm device, a boiler controller, a wall pad, etc.; automatically performs boiler ventilation and indoor air ventilation when the leakage is determined; and directly notifies CO leakage-related authorities and users about the CO leakage.

A carbon monoxide release system using a CO leakage alarm device according to the present disclosure for achieving the above objects is characterized in that it includes: a boiler, which includes a burner and a boiler flue for discharging gas generated during combustion of the burner to the outside, and performs a post purge by recognizing notification information of CO leakage as a request signal for a post purge upon receiving the notification information of CO leakage; a CO leakage alarm device, which detects the impact applied to the boiler flue, measures the amount of CO generated by the boiler, determines the presence/absence of CO leakage due to the deviation of the boiler flue according to the impact strength value and the amount of CO upon detection of the impact of the boiler flue, generates an alarm depending on the presence/absence of CO leakage due to the deviation of the boiler flue, and transmits the notification information of CO leakage; a ventilation system, which ventilates indoor air by circulating the indoor air and outdoor air upon receiving a request for outdoor air ventilation control; and a wall pad, which generates an alarm upon receiving the notification information of CO leakage, recognizes the notification information of CO leakage as a request signal for ventilation, and performs a request for controlling outdoor air ventilation by the ventilation system.

The boiler is characterized in that it includes: the burner; the boiler flue; a boiler ventilator, which discharges the gas present in the burner and the boiler flue to the outside by performing a post purge; a control module, which performs a post purge by controlling the boiler ventilator in the post purge mode; and a controller, which includes an output means that is provided in each room of the indoor space and displays operation information of a boiler according to the operation state of a control module, an input means for operating a boiler by a user, and an alarm means, and thereby receives an input of notification information of CO leakage from the control module and generates an alarm through the alarm means.

The CO leakage alarm device is characterized in that it includes: a CO measurement unit, which includes a CO measurement sensor installed at a position corresponding to the boiler flue, measures and outputs the amount of CO leaking from the boiler through the CO measurement sensor; a collision detection unit, which is attached to the boiler flue, detects a collision and an impact applied to the flue, and outputs an impact strength value according thereto; an alarm-sounding unit, which generates an alarm; and an alarm control unit, which determines the presence/absence of CO leakage due to the deviation of the boiler flue by the flue impact of the boiler through the collision detection unit and the amount of CO being input to the CO measurement unit, and generates an alarm by controlling the alarm-sounding unit according to the presence/absence of CO by the deviation of the boiler flue.

The alarm control unit is characterized in that it includes: a collision monitoring unit, which monitors the presence/absence of a collision in the flue through the collision detection unit, and obtains and outputs an impact strength value due to the collision upon detection of a collision; a CO monitoring unit, which monitors the presence/absence of CO detection through the CO measurement unit, and obtains and outputs the amount of CO upon detection of CO; and a CO leakage determination unit, which determines whether or not CO leakage is due to deviation and damage to the boiler flue caused by the impact strength value and the amount of CO, and upon determining that the CO leakage is due to deviation and damage to the boiler flue, generates an alarm through the alarm-sounding unit.

The CO leakage alarm device is characterized in that it further includes: an interface unit, which includes a boiler ventilation unit that ventilates the combustion engine inside the boiler by a post purge, and a connection unit connected to the control module of the boiler that controls the boiler ventilation unit to perform a post purge mode, wherein the alarm control unit further includes a boiler leakage treatment unit, which upon determining that the CO leakage is due to deviation and damage to the boiler flue through the CO leakage determination unit, outputs a request signal for a post purge to the control module through the connection unit so that the boiler performs the post purge mode.

The CO leakage alarm device is characterized in that it further includes: a communication unit, which is connected to a wired/wireless data communication network by any one of wired and wireless means and performs data communication with a wall pad connected to a ventilation system through a wired/wireless data communication network, wherein the alarm control unit further includes a ventilation leakage treatment unit, which upon determining that the CO leakage is due to deviation and damage of the boiler flue through the CO leakage determination unit, requests to generate an alarm according to the CO leakage the wall pad through the communication unit, and outputs a ventilation request signal for requesting to ventilate the air in the indoor space, where the boiler is installed, with the outdoor air to thereby ventilate the air in the indoor space.

The CO leakage alarm device is characterized in that it further includes: a communication unit, which is connected to a wired/wireless data communication network by any one of wired and wireless means, and performs data communication through a wired/wireless data communication network by being connected to a user mobile terminal of a user registered in advance that uses the indoor space, wherein the alarm control unit further includes a leakage notification unit, which upon determining that the CO leakage is due to deviation and damage of the boiler flue through the CO leakage determination unit, transmits a CO leakage message to the user mobile terminal of the user registered in advance through the communication unit to thereby allow the user mobile terminal, which has received the CO leakage message, to generate an alarm.

A method for discharging CO using a CO leakage alarm device according to the present disclosure for achieving the above objects is characterized in that it includes: a CO leakage alarming process, in which the impact applied to a boiler flue of a boiler is detected, the amount of CO generated by the boiler is measured, the presence/absence of CO leakage due to the deviation of the boiler flue according to the impact strength value and the amount of CO upon detection of the impact of the boiler flue is determined, an alarm is generated depending on the presence/absence of CO leakage due to the deviation of the boiler flue, and the notification information of CO leakage is transmitted; a post purge performing process, in which the boiler recognizes the notification information of CO leakage as a request signal for a post purge upon receiving the notification information of CO leakage and performs a post purge; a ventilation control request process, in which an alarm is generated when a wall pad receives the notification information of CO leakage, and a request signal for outdoor ventilation control is output upon recognizing the notification information of CO leakage as a request signal for ventilation; and an indoor air ventilation process, in which a ventilation system receives a request signal for an outdoor air ventilation control and the indoor air is ventilated by circulating indoor air and outdoor air.

ADVANTAGEOUS EFFECTS

Since the present disclosure determines whether or not CO leakage is due to damage of the boiler flue, an alarm can be generated quickly upon determination of damage of the flue damage, and thus, the present disclosure provides an effect to allow the user to deal with the CO leakage more quickly before being poisoned.

Additionally, the present disclosure generates an alarm through not only an alarm device but also a wall pad or boiler controller installed in each room, and thus provides an effect that the user can be more accurately notified of CO leakage.

Additionally, in the present disclosure, upon detection of CO leakage, the operation of the boiler is stopped and then the gas inside the boiler is discharged by operating the boiler in a post purge mode. Therefore, the present disclosure provides an effect of minimizing the leakage of CO remaining inside the boiler into the user's indoor space. However, post purge may not be performed when damage of the flue is determined.

Additionally, the present disclosure provides an effect of minimizing the user's CO poisoning by operating an indoor ventilation system through the wall pad to thereby ventilate the air in the user's indoor space to the outside, upon detection of CO leakage.

Additionally, in the present disclosure, an alarm is generated by notifying a mobile terminal such as a user's smartphone upon detection of CO leakage, and thus the present disclosure provides an effect that the user can be notified of CO leakage quickly.

Additionally, in the present disclosure, upon detection of CO leakage, it is notified to the related authorities, and thus the present disclosure provides an effect that the CO-poisoned user can be quickly rescued.

DESCRIPTION OF EXEMPLARY EMBODIMENTS

Hereinafter, the configuration and operational actions of the CO leakage alarm device and the CO discharge system according to the present disclosure will be described in detail with reference to the accompanying drawings, and a method of alarming CO leakage and a method of CO discharge in the device will be described.

Figure 1:
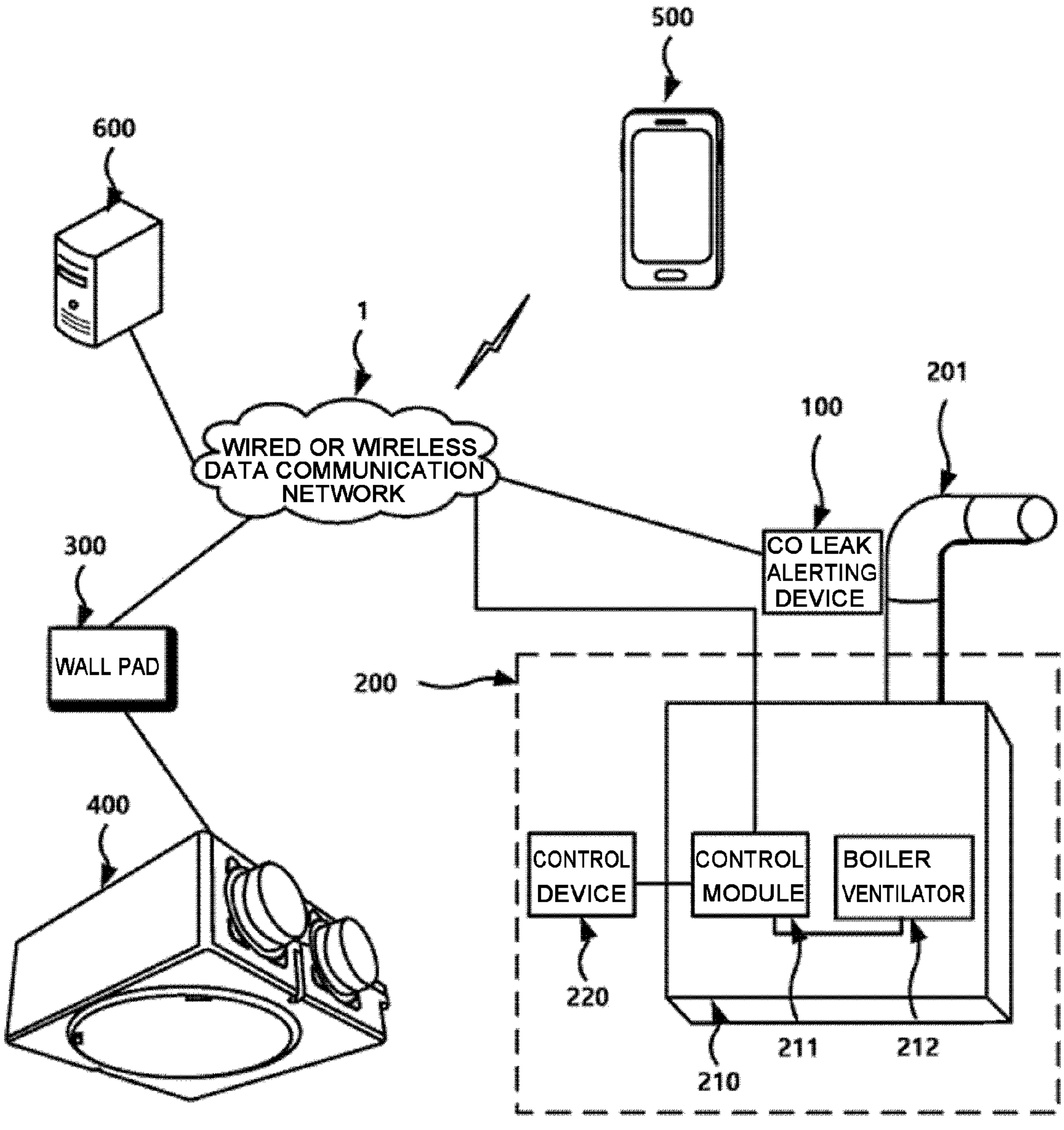
FIG. 1 is a drawing illustrating the configuration of a CO discharge system using a CO leakage alarm device according to the present disclosure.

FIG. 1 is a drawing illustrating the configuration of a CO discharge system using a CO leakage alarm device according to the present disclosure.

Referring to FIG. 1, the CO discharge system using the CO leakage alarm device according to the present disclosure may include a CO leakage alarm device 100 and a boiler 200, and according to the embodiment, may further include a wall pad 300, a ventilation system 400, a user mobile terminal 500, and a server of related authorities 600.

The CO leakage alarm device 100, the boiler 200, the wall pad 300, the user mobile terminal 500, and the related institution server 600 are connected to a wired or wireless data communication unit 1 by any one of wired or wireless data means and thereby perform data communication.

The wired and wireless data communication unit 1 may be a data communication network, in which any one or more among the internet network including a Wi-Fi network and a local area network (LAN) and a mobile flue network (e.g., 3 Generation (3G), 4G, 5G, etc.) are combined.

The CO leakage alarm device 100 detects the impact applied to the boiler flue 201 of the boiler 200, measures the amount of CO generated by the boiler 200, and upon detection of the impact of the boiler flue 201, estimates based on the impact strength value and the measured amount of CO whether the CO leakage is due to the deviation of the boiler flue 201 or leakage from another part (the internal connection part of the boiler, etc.). That is, the CO leakage alarm device 100 estimates whether the CO leakage is due to an impact or leakage due to a natural aging and an installation error.

The CO leakage alarm device 100, upon determination that the CO leakage is due to the deviation of the boiler flue 201, generates an alarm according to the presence/absence of CO leakage due to the deviation and damage of the boiler flue 201, and transmits the notification information of CO leakage to the boiler 200, and transmits to the wall pad 300, the user mobile terminal 500, and the server of related authorities 600 according to the embodiment.

It would be desirable for the CO leakage alarm device 100 to be able to distinguish between general CO leakage and CO leakage due to deviation and damage of the boiler flue 201, and generate an alarm louder than that of a typical CO leakage so as to notify that the CO leakage due to deviation and damage of the boiler flue 201 is more dangerous.

The boiler 200 includes the boiler body 210 and at least one controller 220 installed in each room of the indoor space in which the boiler 200 is installed.

The main body 210 includes a burner (not shown) for burning fuel, a boiler ventilation unit 212 that performs pre-purge and post-purge for discharging the gas generated in the burner through the boiler flue 201 before and after combustion, and a control module 211 that controls the operation of the boiler and controls the boiler ventilation unit 212 so as to perform one of the pre-purge and the post-purge. The control module 211 may be connected to the wired or wireless data communication unit 1 by any one of a wired means and a wireless means. The boiler ventilation unit 212 will include a ventilator (not shown).

The controller 220 is installed in each room of the indoor space where the boiler 200 is installed, and includes an output means for displaying operation information of the boiler according to the operation state of the control module, an input means for operating the boiler by a user, and an alarm means. The controller 220 receives the notification information of CO leakage from the control module 211 and generates an alarm through the alarm means.

The wall pad 300 may be connected to the wired and wireless data communication unit 1 by any one of a wired means and a wireless means, and perform data communication with the control module 211 of the boiler 200, the CO leakage alarm device 100, the user's mobile terminal 500, and the server of related authorities 600.

The wall pad 300 may be connected to the ventilation system (Energy Recovery Ventilation: ERV) 400 and may include a display means (not shown) that displays an operation means (not shown), a display means (not shown) that displays information of operation state of the ventilation system 400 according to the operation of the wall pad 300 to the user, etc.

The wall pad 300 includes an alarm means (not shown) capable of generating an alarm by an alarm, flickering of the display means, etc., and generates an alarm through the alarm means upon receiving notification information of CO leakage from the CO leakage alarm device 100, and ventilates the air in the indoor space by performing an operation, which exchanges the air in the indoor space where the ventilation system 400 is configured with outdoor air, by controlling the ventilation system 400.

Since the ventilation system 400 is a common ERV well known to those skilled in the art, it will not be described in detail.

The user mobile terminal 500 may be a terminal (e.g., a smartphone, a smart pad, etc. that can access the wired/wireless data communication unit 1) of a manager, etc. who lives in an indoor space where the boiler 200 is installed or manages the indoor space.

The user mobile terminal 500, according to the present disclosure, receives the notification information of CO leakage transmitted directly from the CO leakage alarm device 100 or the one transmitted through an application server (not shown) through an installed application, and generates an alarm. The alarm may be a sound such as an alarm and a voice, may be a vibration, may be a flickering of a display means (not shown), may be two or more among a sound, a vibration, and a flickering. The notification information of CO leakage may be transmitted in the form of a push message according to the type of the application server or a mobile flue message (e.g., a short message service (SMS), a long message service (LMS), a multimedia message service (MMS), etc.). If the notification information of CO leakage is transmitted as the push message and the mobile flue message, it is preferable to be configured to generate an alarm by the information of the sender who has sent the push message and the mobile flue message.

The server of related authorities 600 is a server configured in related authorities (e.g., 911 rescue teams, police stations, etc.). It generates an alarm upon receiving the notification information of CO leakage, and displays the notification information of CO leakage. The notification information of CO leakage may include information on a geographic location in which the boiler is installed.

Figure 2:
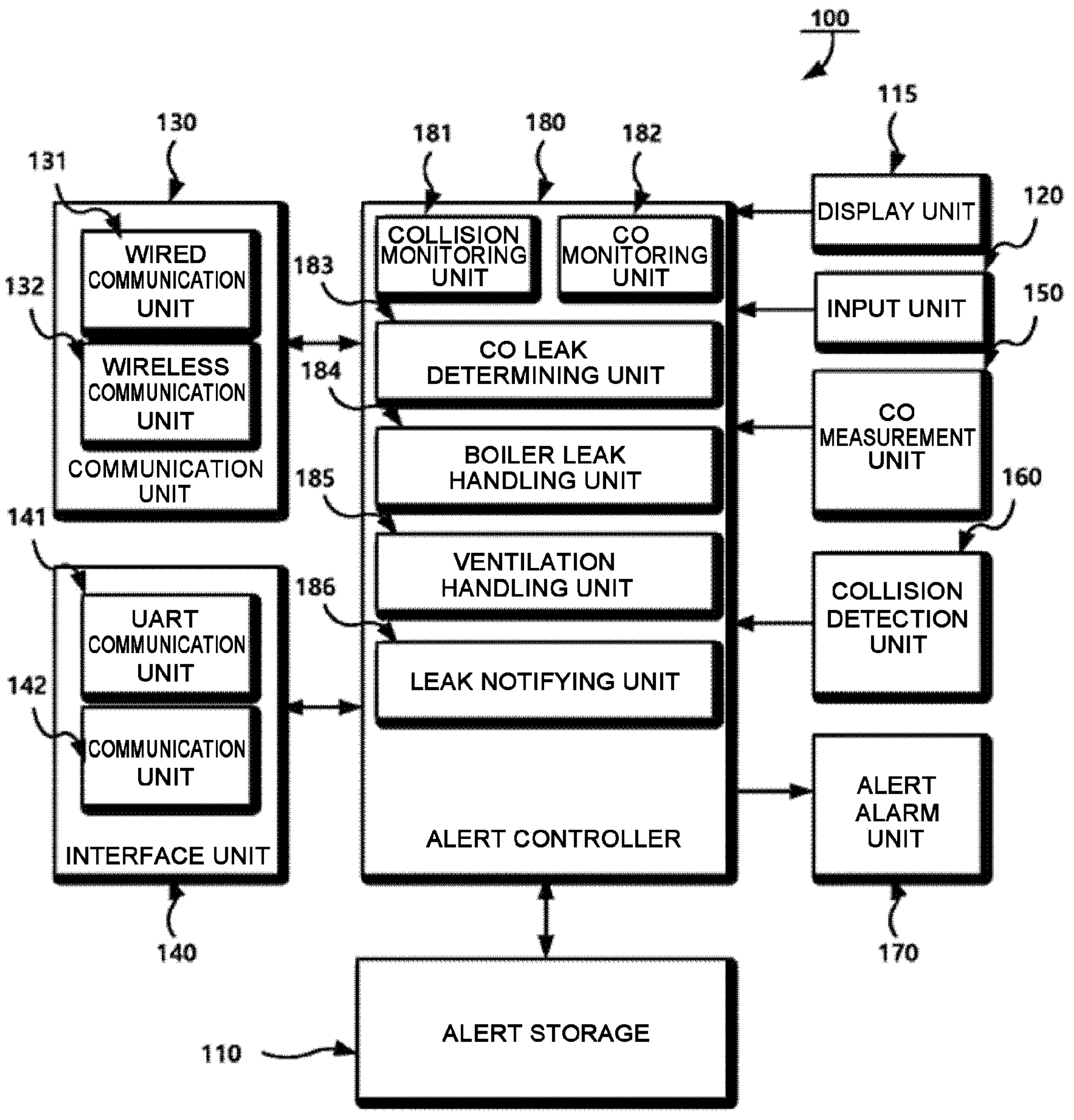
FIG. 2 is a drawing illustrating a detailed configuration of a CO leakage alarm device according to the present disclosure.

FIG. 2 is a view illustrating a detailed configuration of a CO leakage alarm device according to the present disclosure.

Referring to FIG. 2, the CO leakage alarm device 100 includes an alarm storage unit 110, a CO measurement unit 150, a collision detection unit 160, an alarm-sounding unit 170, and an alarm control unit 180; and according to an embodiment, a display unit 115, an input unit 120, a communication unit 130, and an interface unit 140 may be further included.

The alarm storage unit 110 includes a program area for storing a control program to control the overall operation of the CO leakage alarm device 100 according to the present disclosure, a temporary area for temporarily storing data generated during execution of the control program, and a data area for semi-permanently storing at least one of the data generated while executing the control program and the data required to execute the control program.

The data area may store identification information of the wall pad 300, identification information of a user's mobile terminal, information of related authorities, etc. The identification information of the wall pad may be network address information, phone number, etc. of the wall pad, and the identification information of a user's mobile terminal may be the phone number of the user mobile terminal 500, and the information of related authorities may be network address information, phone numbers capable of receiving text messages and data, etc.

The display unit 115 displays various information (e.g., information of operation state of the CO leakage alarm device 100 according to the present disclosure, etc.), buttons for operation, etc. on the screen in one or more texts, graphics, etc.

The input unit 120 may include one or more among a key input device that includes access information for accession into the wall pad 300 and a plurality of keys for setting the phone number of the user mobile terminal 500, a touch pad that is integrally configured on the screen of the display unit 115 and outputs a position signal corresponding to the position being touched, etc.

The communication unit 130 includes a wired communication unit 131 for performing data communication by wired connection to a wired/wireless data communication unit 1 and a wireless communication unit 132 for performing data communication by wirelessly connection to the wired/wireless data communication unit 1.

The wireless communication unit 132 may be a wireless local area network (LAN) device, and it may be connected to a WiFi network of the wired and wireless data communication unit 1 so as to perform wireless data communication.

The interface unit 140 includes a universal asynchronous receiver/transmitter (UART) communication unit 141, which is connected to the wall pad 300 by wire to perform serial data communication as a communication means, and a connection unit 142, which is directly connected to a control module 211 of the boiler 200, and thereby allows to perform a communication between the wall pad 300 and the alarm control unit 180 and to perform a communication between the control module 211 and the alarm control unit 180.

The CO measurement unit 150 measures the amount of CO through a CO measurement sensor installed within a certain distance from the boiler 200 and the boiler flue 201 and outputs the result to the alarm controller 180.

The collision detection unit 160, which includes a collision detection sensor connected to an arbitrary position of the boiler flue 201, detects the presence/absence of a collision in the boiler flue 201, and measures the impact strength value according to the collision detection, and outputs the result to the alarm controller 180. The collision detection sensor may include an acceleration sensor, etc.

The alarm-sounding unit 170 generates an alarm under the control of the alarm controller 180.

The alarm control unit 180, which includes a collision monitoring unit 181, a CO monitoring unit 182, a CO leakage determining unit 183, a boiler leakage processing unit 184, a ventilation leakage processing unit 185, and a leakage notification unit 186, and thereby controls the overall operation of the CO leakage alarm device 100 according to the present disclosure.

Specifically, the collision monitoring unit 181 monitors whether the impact strength value is input through the collision detection unit 160, and outputs the impact strength value to the CO leakage determination unit 183 when the impact strength value is input.

The CO monitoring unit 182 monitors whether the CO amount value is input through the CO measurement unit 150 to continuously monitor the presence/absence of CO detection, and outputs the result to the CO leakage determination unit 183 when the CO amount value is input.

The CO leakage determination unit 183 receives an impact strength value which is input from the collision monitoring unit 181 and a CO amount value which is input from the CO monitoring unit 182, and determines the presence/absence of deviation and damage of the boiler flue 201 according to the impact strength value and the CO amount value. For example, when the CO leakage determination unit 183 has an impact strength of greater than or equal to the first reference strength, and the CO value exceeds the first reference CO value, it may be determined that the boiler flue 201 is deviated by 10% due to the impact, or an area of X % is damaged; and if the impact strength value exceeds the first reference strength and the CO value exceeds the second reference CO value (the second reference CO value> the first reference CO value), it may be determined that the boiler flue 201 is deviated by 20%, that an area of Y % is damaged (generation of hole(s)), etc. The first reference strength, the first reference CO amount value, the second reference CO amount value, etc. may be determined by experiments.

If the impact strength is greater than or equal to the first reference strength even when no impact has occurred, the CO leakage determination unit 183 may determine that the boiler flue 201 is deviated due to a defect in the boiler flue connection, etc. Even in this case, the CO leakage determination unit 183 will process in the same way as when there is a deviation or damage of the boiler flue 201 due to an impact.

The CO leakage determination unit 183 generates an alarm through the alarm-sounding unit 170 upon determination of deviation or damage of the boiler flue 201 and CO leakage.

The boiler leakage processing unit 185, upon determination of CO leakage due to deviation or damage of the boiler flue 201 in the CO leakage determination unit 183, transmits the notification information of CO leakage to the module 211 of the boiler 200 through the connection unit 142.

The control module 211 of the boiler 200 having received the notification information of CO leakage recognizes the notification information of CO leakage as a request signal for a post purge, and controls the boiler ventilator 212 to perform a post purge.

The boiler leakage processing unit 185, upon determination of CO leakage due to deviation or damage of the boiler flue 201 in the CO leakage determination unit 183, transmits the notification information of CO leakage to the wall pad 300 through the UART communication unit 141.

Then, the wall pad 300 generates an alarm through an alarm means and controls the ventilation system 400 so as to ventilate the air of the indoor space, where the boiler 200 is installed, with outdoor air.

The leakage notification unit 186, upon determination of CO leakage due to deviation or damage of the boiler flue 201 in the CO leakage determination unit 183, transmits the notification information of CO leakage to any one or more selected from the user mobile terminal 500 and the server of related authorities 600 registered in advance in the alarm storage unit 110.

As described above, the notification information of CO leakage may include location information regarding the geographical location where the boiler is installed, date, time, the presence/absence of damage in the boiler flue, a CO amount value, etc.

The user mobile terminal 500 and the server of related authorities 600, upon receiving the notification information of CO leakage, will generate an alarm and display the notification information of CO leakage through a display means (not shown).

Figure 3:
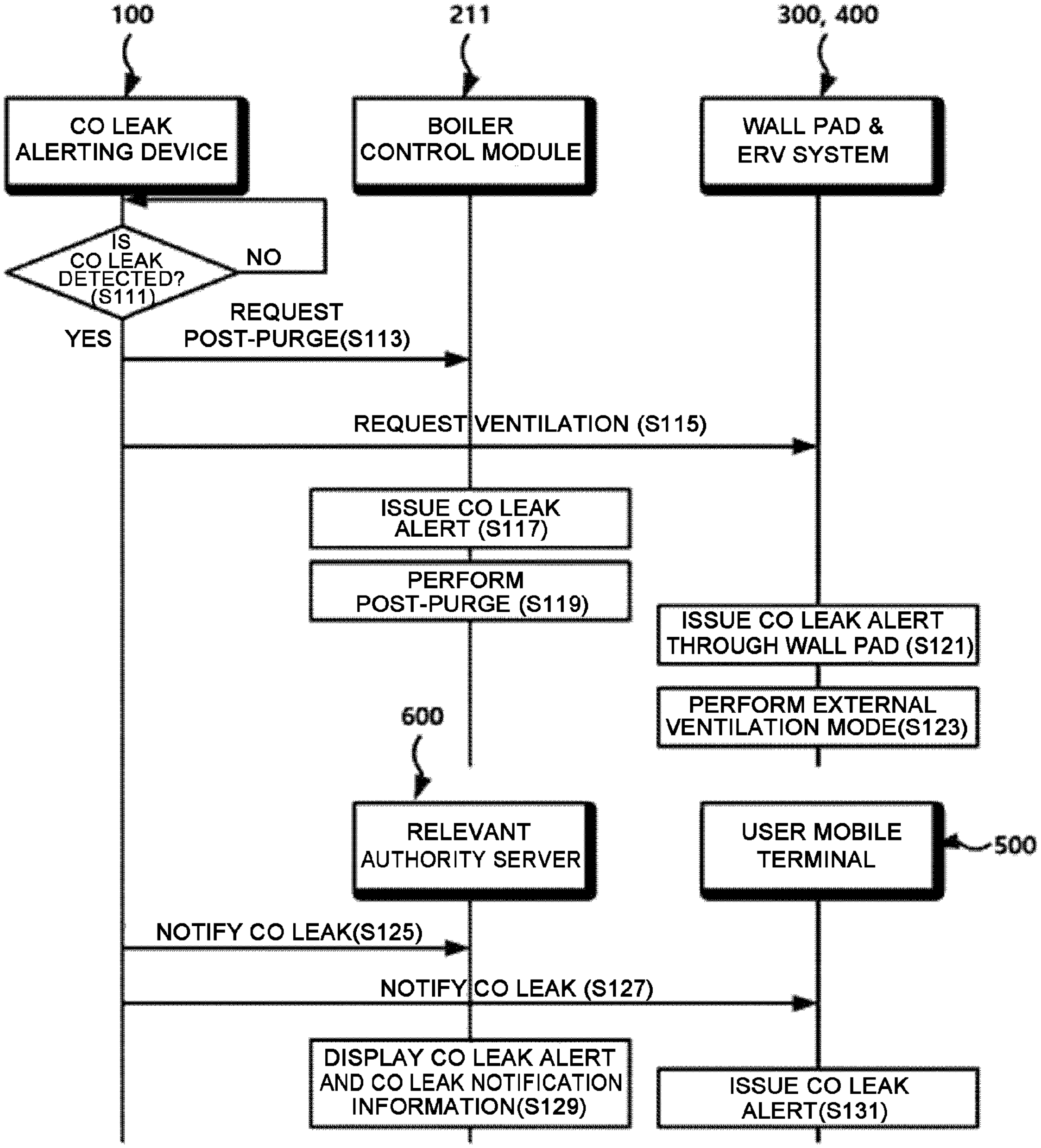
FIG. 3 is a flow chart illustrating a method for discharging CO according to the present disclosure.

FIG. 3 is a flow chart illustrating a method for discharging CO according to the present disclosure.

Referring to FIG. 3, first of all, the alarm controller 180 of the CO leakage alarm device 100 monitors whether CO leakage due to deviation and damage of the boiler flue 201 is detected (S111).

Upon detection of CO leakage due to deviation or damage of the boiler flue 201, the alarm controller 180 transmits the notification information of CO leakage to the control module 211 of the boiler 200 as a request signal for a post purge, and transmits the notification information of CO leakage to the wall pad 300 as a request signal for ventilation (S113, S115).

The control module 211 of the boiler 200, upon receiving the request signal for ventilation (i.e., upon receiving the notification information of CO leakage), generates an alarm notifying that CO leakage has occurred through an alarm generating means (not shown) of the boiler per se or a controller installed in each room (220) (S115).

After generating the alarm, the control module 211 controls the boiler ventilation unit 212 so as to perform a post purge, and thereby discharges the gas present in the burner (not shown), the pipe (not shown), and the boiler flue 201 of the boiler 200 to the outside (S117).

In contrast, the wall pad 300 generates a CO leakage alarm through an alarm means (not shown) (S121) and controls the ventilation system 400 so as to perform an external ventilation mode (S123).

Additionally, according to an embodiment, the alarm controller 180 of the CO leakage alarm device 100 may transmit the notification information of CO leakage to the server of related authorities 600 and the user mobile terminal 500 (S125, S127).

The server of related authorities 600, upon receiving the notification information of CO leakage, will generate an alarm to the corresponding department of the related authorities and displays the notification information of CO leakage (S127).

The user mobile terminal 500, which has received the notification information of CO leakage, will also generate an alarm (S131). The user mobile terminal 500 may also be configured to display notification information of CO leakage.

Figure 4:
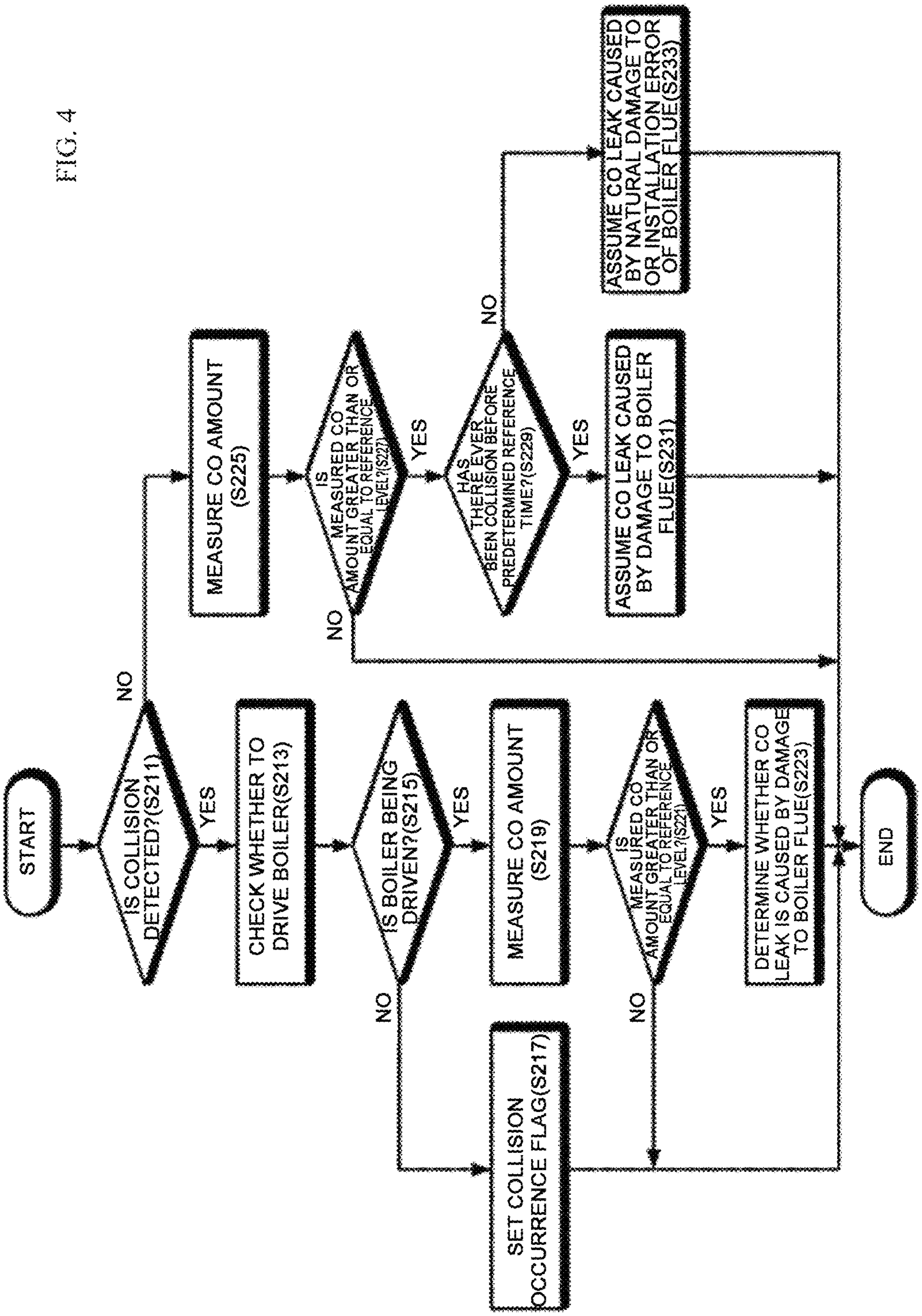
FIG. 4 is a flow chart illustrating a method for generating an alarm of CO leakage by a CO leakage alarm device according to the present disclosure.

FIG. 4 is a flow chart illustrating a method for generating an alarm of CO leakage by a CO leakage alarm device according to the present disclosure, and is a flowchart illustrating a method for determining a CO leakage due to damage of a release hole in a CO leakage alarm device.

Referring to FIG. 4, the alarm controller 180 monitors whether a collision is detected through the collision detection unit 160 (S211).

When a collision is detected, the alarm controller 180 will be able to check whether the boiler operates through the control module 211 of the boiler 200 (S213).

After checking whether the boiler operates, the alarm controller 180 determines whether the boiler is under operation (S215), and when the boiler is under operation, it sets up a collision occurrence flag informing that a collision has occurred (S217).

Meanwhile, when the boiler is under operation, the alarm controller 180 measures the amount of CO through the CO measurement unit 150 (S219).

Upon measurement of the amount of CO, the alarm controller 180 checks whether the measured amount of CO exceeds the reference amount of CO (S221).

When the measured CO amount exceeds the reference CO amount, CO leakage due to damage of the boiler flue 201 is determined.

In the description above, the presence/absence of CO leakage was determined only based on the presence/absence of the damage of the boiler flue 201 and one reference value of CO, but the degree of deviation and damage of the boiler flue may be estimated in detail as described above by comparing the collision strength value and the CO amount value with a number of reference levels having mutually-different CO values and CO amount values.

Meanwhile, when a collision is not detected in the boiler flue 201, the alarm controller 180 measures the CO amount of through the CO measurement unit 150 (S225).

After measuring the CO amount, the alarm controller 180 determines whether the measured CO is greater than or equal to a preset reference amount of CO (S227).

When the measured CO amount is higher than the reference CO amount, the alarm controller 180 examines the collision occurrence flag and determines whether the collision has occurred before a preset reference time based on whether the collision occurrence flag is set to three (S229).

If the collision has ever occurred within a certain period of time, the alarm control unit 180 estimates that CO leaks due to damage to the boiler flue (S231).

However, if no collision has occurred within a certain period of time, the alarm controller 180 estimates that the boiler flue 201 has been naturally damaged or CO leakage has been damaged due to an installation error (S233).

Figure 5:
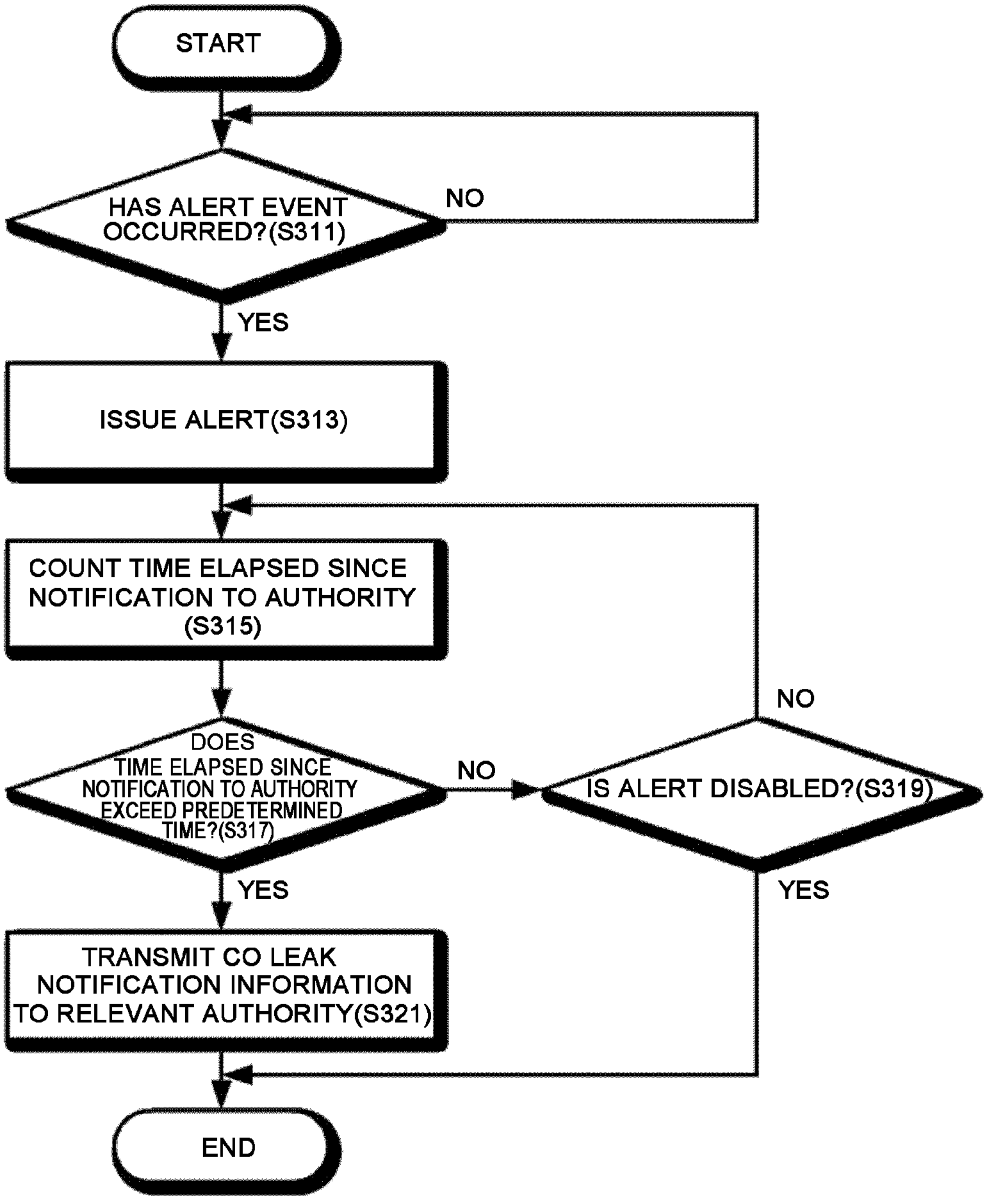
FIG. 5 is a flow chart illustrating a method of notifying related authorities among the methods of discharging CO according to the present disclosure.

FIG. 5 is a flow chart illustrating a method of notifying related authorities among the methods of discharging CO according to the present disclosure, and it is a flow chart which can be performed in any one or more of the CO leakage alarm device 100, the control module 211, the wall pad 300, and the user mobile terminal 500. However, in the description herein below, for the convenience of description, the description is limited to the case performed by the user mobile terminal 500.

The user mobile terminal 500 checks whether an alarm event occurs due to reception of the notification information of CO leakage from the CO leakage alarm device 100 (S311).

When the alarm event occurs, the user mobile terminal 500 generates an alarm (S313).

After the alarm is generated, the user mobile terminal 500 counts the notification time to authorities (S315), and checks whether the notification time being counted to authorities exceeds a preset certain reference time (S317), and whether the alarm is released before the preset reference time (S319).

If the alarm is released before the notification time to authorities exceeds the reference time, the process is terminated, whereas if the alarm is not released until the notification time to authorities exceeds the reference time, the notification information of CO leakage is transmitted to the preset server of related authorities 600 (S321).

Meanwhile, those of ordinary skill in the art could easily understand that the present disclosure is not limited to the typical preferred embodiments described above, but can be implemented with various improvements, changes, substitutions, or additions without departing from addition within the scope not departing from the gist of the present disclosure. If the implementation by such improvements, changes, substitutions, or additions falls within the scope of the following appended claims, the technical idea should also be regarded as belonging to the present disclosure.

[Explanation of Codes]

| | |
|---|---|
| 100: | CO leakage alarm device |
| 110: | alarm storage unit |
| 115: | display unit |
| 120: | input unit |
| 130: | communication unit |
| 131: | wired communication unit |
| 132: | wireless communication unit UART communication unit |
| 140: | interface unit |
| 142: | connection unit |
| 150: | carbon monoxide measurement unit |
| 160: | collision detection unit |
| 170: | alarm-sounding unit |
| 180: | alarm control unit |
| 181: | collision monitoring unit |
| 182: | CO monitoring unit |
| 183: | CO leakage determination unit |
| 184: | boiler leakage processing unit |
| 185: | ventilation leakage processing unit |
| 186: | leakage notification unit |
| 200: | boiler |
| 201: | boiler flue |
| 210: | boiler body |
| 211: | control module |
| 212: | boiler ventilation |
| 220: | controller |
| 300: | wall pad |
| 400: | ventilation system |
| 500: | user mobile terminal |

What is claimed is:

1. A system for discharging carbon monoxide (CO) using a CO leakage alarm device, comprising:

a boiler, which comprises a burner and a boiler flue for discharging gas generated during combustion of the burner to the outside, and performs a post purge by recognizing notification information of CO leakage as a request signal for the post purge upon receiving the notification information of CO leakage;

a CO leakage alarm device, which detects an impact applied to the boiler flue, measures an amount of CO generated by the boiler, determines a presence/absence of CO leakage due to a deviation of the boiler flue according to an impact strength value and the amount of CO upon detection of the impact of the boiler flue, generates an alarm depending on the presence/absence of CO leakage due to the deviation of the boiler flue, and transmits the notification information of CO leakage;

a ventilation system, which ventilates indoor air by circulating the indoor air and outdoor air upon receiving a request for outdoor air ventilation control; and a wall pad, which generates an alarm upon receiving the notification information of CO leakage, recognizes the notification information of CO leakage as a request signal for ventilation, and performs a request for controlling outdoor air ventilation by the ventilation system;

wherein the boiler further comprises:

a boiler ventilator, which discharges the gas present in the burner and the boiler flue to the outside by performing a post purge;

a control module, which performs the post purge by controlling the boiler ventilator in the post purge mode; and a controller, which comprises an output means that is provided in a room of an indoor space and displays operation information of the boiler according to an operation state of the control module, an input means for operating the boiler by a user, and an alarm means, and thereby receives an input of notification information of CO leakage from the control module and generates an alarm through the alarm means;

wherein the CO leakage alarm device comprises:

a CO measurement unit, which comprises a CO measurement sensor installed at a position corresponding to the boiler flue, measures and outputs the amount of CO leaking from the boiler through the CO measurement sensor;

a collision detection unit, which is attached to the boiler flue, detects a collision and the impact applied to the boiler flue, and outputs the impact strength value according thereto;

an alarm-sounding unit, which generates an alarm; and an alarm control unit, which determines the presence/absence of CO leakage due to the deviation of the boiler flue by the impact of the boiler flue through the collision detection unit and the amount of CO being input to the CO measurement unit, and generates an alarm by controlling the alarm-sounding unit according to the presence/absence of CO by the deviation of the boiler flue.

2. The system of claim 1, wherein the alarm control unit comprises:

a collision monitoring unit, which monitors the presence/absence of a collision in the boiler flue through the collision detection unit, and obtains and outputs the impact strength value due to the collision upon detection of a collision;

a CO monitoring unit, which monitors the presence/absence of CO detection through the CO measurement unit, and obtains and outputs the amount of CO upon detection of CO; and a CO leakage determination unit, which determines whether or not CO leakage is due to deviation and damage of the boiler flue caused by the impact strength value and the amount of CO, and upon determining that the CO leakage is due to deviation and damage of the boiler flue, generates an alarm through the alarm-sounding unit.

3. The system of claim 2, wherein the CO leakage alarm device further comprises an interface unit, which comprises the boiler ventilation unit that ventilates a combustion engine inside the boiler by the post purge, and a connection unit connected to the control module of the boiler that controls the boiler ventilation unit to perform the post purge mode, wherein the alarm control unit further comprises a boiler leakage processing unit, which upon determining that the CO leakage is due to deviation and damage of the boiler flue through the CO leakage determination unit, outputs a request signal for the post purge to the control module through the connection unit so that the boiler performs the post purge mode.

4. The system of claim 2, wherein the CO leakage alarm device further comprises a communication unit, which is connected to a wired/wireless data communication network by any one of wired and wireless means and performs data communication with the wall pad connected to the ventilation system through the wired/wireless data communication network, wherein the alarm control unit further comprises a ventilation leakage processing unit, which upon determining that the CO leakage is due to deviation and damage of the boiler flue through the CO leakage determination unit, requests to generate an alarm according to the CO leakage the wall pad through the communication unit, and outputs a ventilation request signal for requesting to ventilate the air in the indoor space, where the boiler is installed, with the outdoor air to thereby ventilate the air in the indoor space.

5. The system of claim 2, wherein the CO leakage determination unit further comprises a communication unit, which is connected to a wired/wireless data communication network by any one of wired and wireless means, and performs data communication through a wired/wireless data communication network by being connected to a user mobile terminal of a user registered in advance that uses the indoor space, wherein the alarm control unit further comprises a leakage notification unit, which upon determining that the CO leakage is due to deviation and damage of the boiler flue through the CO leakage determination unit, transmits a CO leakage message to the user mobile terminal of the user registered in advance through the communication unit to thereby allow the user mobile terminal, which has received the CO leakage message, to generate an alarm.

* * * * *